United States Patent
Sputh et al.

(10) Patent No.: US 9,074,503 B2
(45) Date of Patent: Jul. 7, 2015

(54) CLEAN EXHAUST SYSTEM AND METHOD FOR DIESEL ENGINES OF MARINE VESSELS

(71) Applicant: CCTS Technology Group, Inc., Indianapolis, IN (US)

(72) Inventors: Carl T. Sputh, Indianapolis, IN (US); Andrew J. Connolly, Nelson and Bays (NZ)

(73) Assignee: CCTS Technology Group, Inc., Indianapolis, IN (US)

(*) Notice: Subject to any disclaimer, the term of this patent is extended or adjusted under 35 U.S.C. 154(b) by 214 days.

(21) Appl. No.: 13/842,649

(22) Filed: Mar. 15, 2013

(65) Prior Publication Data

US 2013/0283768 A1   Oct. 31, 2013

Related U.S. Application Data

(60) Provisional application No. 61/638,669, filed on Apr. 26, 2012.

(51) Int. Cl.
*F01N 3/00* (2006.01)
*F01N 3/02* (2006.01)
(Continued)

(52) U.S. Cl.
CPC .............. *F01N 3/021* (2013.01); *F02B 61/045* (2013.01); *B63H 21/32* (2013.01); *F01N 3/04* (2013.01);
(Continued)

(58) Field of Classification Search
USPC ......... 60/274, 286, 295, 324; 440/88 G, 88 J, 440/89 B, 89 C
See application file for complete search history.

(56) References Cited

U.S. PATENT DOCUMENTS 2,787,454 A    4/1957    Coppola
3,353,336 A    11/1967   Caballero
(Continued)

FOREIGN PATENT DOCUMENTS

DE    4313132    10/1994
EP    0703352    3/1996
(Continued)

OTHER PUBLICATIONS

Alejandro Hombravella, Alican Kilicaslan, Jeremy Perales, Carolin Rub; Study of Exhaust Gas Cleaning Systems for vessels to fulfill IMI III in 2016; Fachhochschule Kiel University of Applied Sciences; 2011; 1-219; Caterpillar; European Project Semester 2011.
(Continued)

*Primary Examiner* — Audrey K Bradley
*Assistant Examiner* — Dapinder Singh
(74) *Attorney, Agent, or Firm* — SmithAmundsen LLC; Dennis S. Schell (57) ABSTRACT

An emission control system (ECS) and associated method for facilitating the emulsification and/or dispersion of hydrocarbon, diesel particulate matter (DPM) and other pollutants from the exhaust gas output from a diesel engine of a marine vessel, includes a pump, a control system that controls the pump, and a product container containing an environmentally approved dispersing product. The ECS injects dispersing product into the engine's water cooling and exhaust system, for example, into the cooling water downstream of the engine and upstream of the spray ring or mixing elbow of the exhaust system. The environmentally approved dispersing product is drawn from the product container via the pump and injected at a controlled rate into the raw cooling water, and the dispersing product/cooling water mixture admixes with the exhaust gas resulting in emulsification and/or dispersion of the hydrocarbon, DPM and other pollutants present in the exhaust gas.

22 Claims, 3 Drawing Sheets

(51) Int. Cl.
*F01N 3/10* (2006.01)
*F01N 3/20* (2006.01)
*F01N 3/04* (2006.01)
*F01N 3/021* (2006.01)
*F02B 61/04* (2006.01)
*B63H 21/32* (2006.01)
*F01N 13/00* (2010.01)

(52) U.S. Cl.
CPC ........... *F01N 13/004* (2013.01); *F01N 2590/02* (2013.01); *F01N 2610/00* (2013.01); *F01P 2060/16* (2013.01); *Y02T 10/20* (2013.01)

(56) References Cited

U.S. PATENT DOCUMENTS

| | | |
|---|---|---|
| 4,120,671 A | 10/1978 | Steinmeyer |
| 2003/0121253 A1 | 7/2003 | Ford et al. |
| 2006/0021337 A1 | 2/2006 | Brady |
| 2006/0218904 A1 | 10/2006 | Brady |
| 2011/0083556 A1* | 4/2011 | Duesel et al. .................. 95/158 |
| 2011/0306254 A1 | 12/2011 | Woods |

FOREIGN PATENT DOCUMENTS

| | | |
|---|---|---|
| FR | 2831923 | 5/2003 |
| JP | 10331623 | 12/1998 |
| JP | 2001314721 | 11/2001 |
| JP | 2007245055 | 9/2007 |
| KR | 100750480 | 8/2007 |
| TW | 201103624 | 2/2011 |
| WO | 2011060792 | 5/2011 |

OTHER PUBLICATIONS

Richard Boggs; Soot Solutions; Dockwalk.com; Oct. 2011; 63-67.

* cited by examiner

CLEAN EXHAUST SYSTEM AND METHOD FOR DIESEL ENGINES OF MARINE VESSELS

CROSS-REFERENCE TO RELATED APPLICATIONS

This is a nonprovisional patent application of U.S. Provisional Patent Application No. 61/638,669, filed Apr. 26, 2012, and titled CLEAN EXHAUST SYSTEM AND METHOD FOR DIESEL ENGINES OF MARINE VESSELS, which is incorporated herein by reference.

BACKGROUND

This invention relates generally to diesel fuel control systems, and more particularly to diesel systems and methods for controlling hydrocarbon and diesel particulate matter levels in diesel exhaust emissions to assure safe environmental operation of diesel engines.

Internal combustion engines are designed to operate most efficiently on standard quality fuels, and the presence of impurities or non-combustible contaminants may result in poor engine performance or impairment as well as produce higher levels of exhaust impurities. It has been reported that even small quantities of water in diesel fuel may prevent satisfactory operation of a diesel engine, and most diesel engines now have some type of water-separator in addition to filters for removing sediment or other solids that may have been introduced into the fuel tank. It has also been reported that the presence of air entrained in diesel fuel delivered to a fuel injection system results in poorer engine performance since the amount of air required for optimum combustion is already precisely controlled by the fuel injection system itself. It is thus clear that the presence of these non-fuel contaminants in a diesel fuel delivery system results in poor engine performance with the extended result of less complete fuel burning and an increase in deleterious exhaust pollutants.

Most modern marine vessels with inboard engines have "wet exhaust" systems, wherein water is injected into the system to cool exhaust gases, and then passed overboard through the exhaust outlet. On a marine vessel with a water-cooled exhaust, the water in which the vessel floats (called "raw water") cools both the engine and the exhaust. In the most common arrangement, a raw-water pump draws water from the engine intake seacock and through a strainer. It then pumps this water through a heat exchanger, and perhaps an oil cooler or two that are used to cool the engine, and then into the engine exhaust system, for example, via a water-injection nipple connected to a spray ring or mixing elbow in which the exhaust gases mix with the cooling water. The water then flows with the exhaust gases into a water silencer box, also called a water-lift box. The discharge pipe of the water-lift box is set slightly above the bottom of the box. The water level rises until it blocks the discharge pipe, at which point the trapped exhaust gases build up sufficient pressure to lift the water up the exhaust pipe and out of the boat, generally discharging the mix of water and exhaust gases through the hull, below the water line.

A wet exhaust has several advantages over a dry exhaust. The injected water lowers the temperature of the exhaust gases from as high as 2000° F. to below 212° F., cooling the gases sufficiently to allow the use of flexible hose at or shortly after the water injection point. Flexible hose is easier to run than pipe, is not subject to corrosion or stress cracking, and absorbs the movement and vibration of a flexibly mounted engine. The water-cooled exhaust needs no insulation, and does not pose a fire or burn hazard to either the boat or crew. What's more, as the temperature of the exhaust gases falls, the volume of the gases declines proportionately, reducing exhaust noise. At the same time, the minimal exhaust back pressure generally needed to lift the exhaust water out of the boat also muffles the sound.

During operation, diesel engines that are typical of marine vessels produce various exhaust pollutants, including unburned hydrocarbons, carbon oxides and nitrogen oxides, sulfurous gases and other particulate matter generally called "diesel particulate matter" (DPM). In particular, diesel exhaust systems of marine engines, such as diesel engines in yachts, can have adverse aesthetic effects and adverse environmental effects on marine ecosystems due to the discharge of pollutants such as hydrocarbons and DPM, which accumulate and agglomerate in marinas, on boat decks and hulls, and elsewhere. The particulates are solids, such as ash from lubricating oils, metal particles scraped from the cylinder walls, and dirt and dust that gets past the air filters. Current attempts to provide solutions to this problem include installing complex filtering systems and exhaust scrubbers. However, these solutions have various limitations due to factors such as complexity of the filter and scrubber systems and their high cost. Depending on the engine's mechanical condition, fuel and load, soot can make up 60 to 80 percent of the particulates. Aerosols, or ultrafine drops of water, fuel and other chemicals make up the remainder (R. Boggs, Dockwalk.com, October 2011, pp. 63-67).

Soot is an unavoidable byproduct of burning fuel oil in a diesel engine. Even when a diesel fuel is burning clean with no visible smoke, particulates still are a problem. This problem is most evident when vessels are docked or moored and diesel engine-driven electrical generators are being run for extended times and no forward velocity is available, so the DPM builds up in the water alongside the vessel. It has been reported that even a clear exhaust will foul the hull downwind with a swoop of yellow or black residue. Additionally, DPM collects on the surface of the water and nearby structures, including docks or other vessels. While a lesser problem, this is also true for the exhaust of diesel engines used for propulsion when the vessel is not underway or when maneuvering very slowly.

A perfectly operating 100 kW Tier 2-certified diesel engine driven generator, operating under optimum conditions, may legally discharge 720 grams (more than one and a half pounds) of particulates per day. This discharge, sometimes also referred to as "randomly agglomerated carbonaceous spherules," is composed of particles that vary widely in size from around 4 μm (micron) down to 0.04 μm, with the majority of particles around 0.1 μm, which may explain how even invisible exhaust may contain a large amount of particulates that can bind with the surface of paint that appears to be as smooth and hard as glass.

It has been reported that installation of equipment for reduction of DPM on marine vessels has lagged far behind other industries because, until very recently, regulators considered the impact of marine air pollutants comparatively insignificant. The few exhaust emission regulations that applied to marine installations concentrated on major greenhouse gases such as oxides of sulfur and nitrogen. Particulate emissions from even the largest yachts remain essentially unregulated. The Engine International Air Pollution Prevention (EIAPP) certificate refers to $NO_x$ emissions from diesel engines that produce more than 130 kilowatts, not particulates, and until the International Maritime Organization (IMO) or port states impose limits or declare visible soot a marine pollutant, the problem is left to marina managers to decide how much soot is too much.

Systems that have been devised in the art to overcome some of the above problems are often quite complicated and costly, primarily involving elaborate filtering and scrubber systems. For example, US 2006/0021337, titled "Diesel Emissions Filtering System and Method," discloses DPM reduction from diesel engine exhaust gases via passage of the gases through a scrubbing apparatus containing water and a low foaming wetting composition having high affinity for hydrocarbons. Likewise, U.S. Pat. No. 3,353,336, titled "Exhaust Gas Treatment Device," discloses an exhaust gas treatment chamber comprising a plurality of compartments with angularly sloping baffles, a liquid recirculation system including a plurality of spray nozzles for dispersing liquid and a filter, and a chemical absorbent solution of borax, chlorophyll, trisodium phosphate and n-lauryl sulphate.

Accordingly, there is a need to develop new, practical, inexpensive solutions for facilitating eco-friendly dispersion, reduction or elimination of hydrocarbon, DPM and other pollutants from the exhaust gas emissions of diesel engines of marine vessels.

SUMMARY

The present invention may comprise one or more of the features recited in the attached claims, and/or one or more of the following features and combinations thereof.

An illustrative embodiment of the invention includes an emission control system (ECS) for facilitating the emulsification and/or dispersion of hydrocarbon, diesel particulate matter (DPM) and other pollutants from the exhaust gas output from a diesel engine of a marine vessel, the diesel engine including a water cooling and exhaust system, comprising a dosing pump (DP), a control box (CB) that controls the DP, a product container (PC) containing an environmentally approved dispersing product, and a supply tube coupling the dosing pump and water-cooled exhaust system. The ECS is connected to the engine's water cooling and exhaust system, for example, at a connection point either before or after the raw cooling water outlet pipe connects to the spray ring or mixing elbow and the exhaust pipe of the marine vessel. The environmentally approved dispersing product is drawn from the product container via the dosing pump and injected at a controlled rate into the raw cooling water, and the resulting mixture of dispersing product and cooling water admixes with the exhaust gases, resulting in capture and dispersion of the hydrocarbon, DPM and other pollutants.

In another embodiment, described herein is a method for facilitating the emulsification and/or dispersion of hydrocarbon, diesel particulate matter (DPM) and other pollutants from the exhaust gas output from a diesel engine of a marine vessel. This method comprises the steps of drawing an environmentally approved dispersing product and injecting it at a controlled rate into the raw cooling water of a diesel engine of the marine vessel at a point either upstream or downstream from the exhaust system's spray ring or mixing elbow. In one illustrative aspect, said steps are carried out in a continuous manner. In another illustrative aspect, the rate of drawing and injecting the dispersing product is controlled by a dosing pump. In another illustrative aspect, the rate of drawing and injecting the dispersing product can be either steady or variable, or a combination of both, depending on the design and operation of each particular engine.

It is understood that DPM (diesel particulate matter) as used herein shall generally mean all forms of hydrocarbon, soot, and other carbonaceous matter, carbon or nitrogen oxides, sulfurous gases and related particulate matter. DPM may also be referred to as "particulate carbonaceous matter".

A principal object of the invention herein is to provide a system and method for enhancing the eco-friendly dispersion of diesel particulate matter, hydrocarbon and other pollutants from diesel exhaust gases of marine vessels prior to final discharge thereof to the environment, especially into marine environments.

Another object is to prevent the accumulation and agglomeration of diesel particulate matter, hydrocarbon and other pollutants from diesel exhaust gases of marine vessels in marinas, on boat decks and hulls, and elsewhere.

Another object is to provide a system and method for enhancing the eco-friendly dispersion of diesel particulate matter, hydrocarbon and other pollutants from diesel exhaust gases of marine vessels and preventing their accumulation and agglomeration in marinas, on boat decks and hulls, and elsewhere, without having to resort to the use of expensive and complex filtering and scrubbing systems, without the use of expensive chemical agents, and by using simple, low-cost systems and equipment and labor saving methods.

It is a still further object to provide a system and method as described in the preceding paragraphs by using eco-friendly, biodegradable, inexpensive dispersing products approved for use in marine environments.

Advantageously, it has also been found that the presence of the dispersing product in the cooling water and exhaust mix in exhaust pipe has a significant cleaning effect on the interior surface of the exhaust pipe and any downstream mufflers or other system components, removing DPM and other coatings from their interior surfaces. This is believed to likely increase the service life of these components as the buildup of DPM and other debris typically advances the corrosive effect, for example from electrolysis, of the build up and the flow of water, for example, sea water, and exhaust through the components.

Additional features of the disclosure will become apparent to those skilled in the art upon consideration of the following detailed description of the illustrative embodiments.

BRIEF DESCRIPTION OF THE DRAWINGS

The detailed description particularly refers to the accompanying figures in which.

DESCRIPTION OF THE ILLUSTRATIVE EMBODIMENTS

For the purposes of promoting and understanding the principals of the invention, reference will now be made to one or more illustrative embodiments illustrated in the drawings, and specific language will be used to describe the same.

Figure 1:
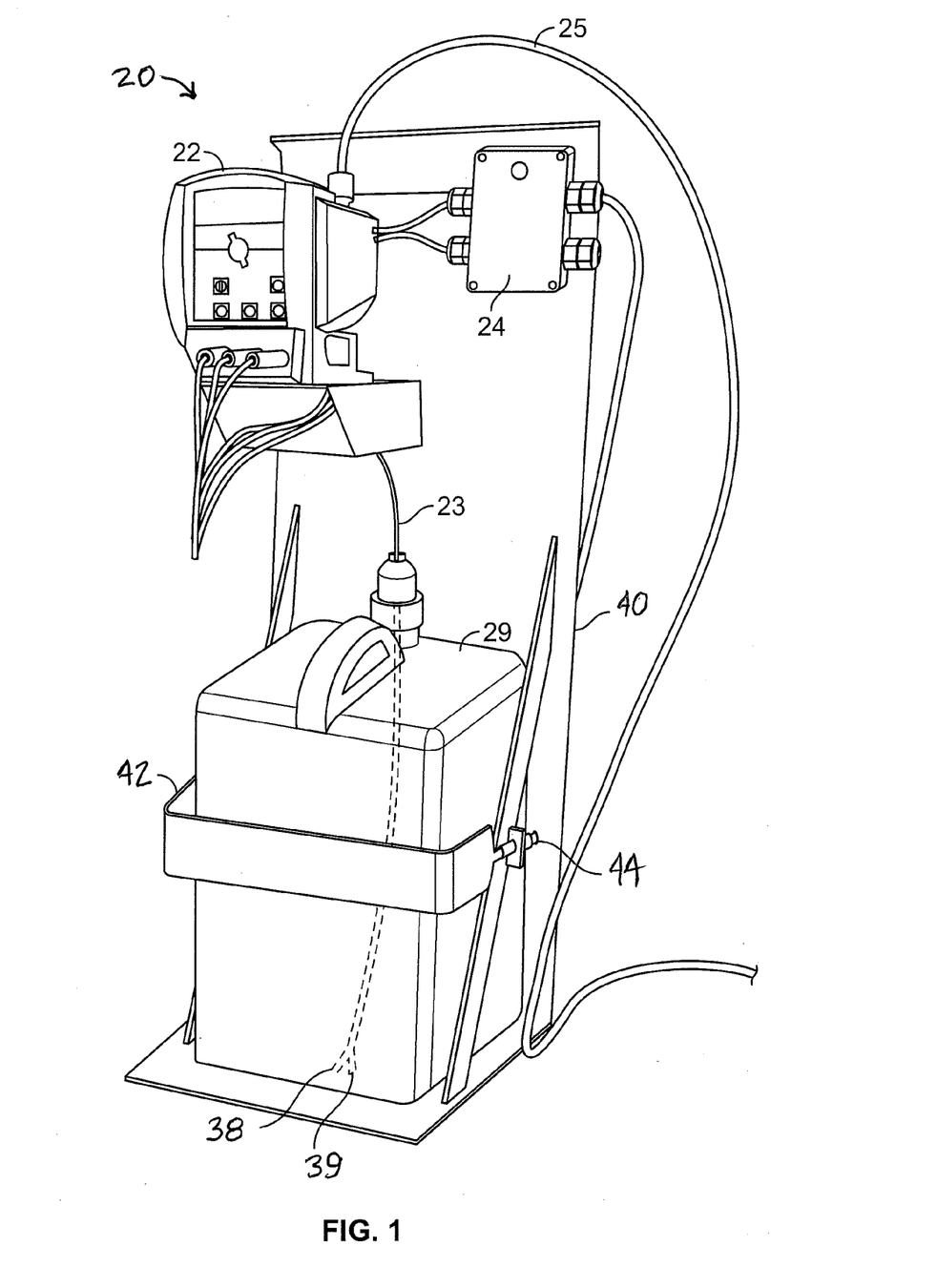
FIG. 1 is an illustrative embodiment of the ECS of the invention herein.
Figure 3:
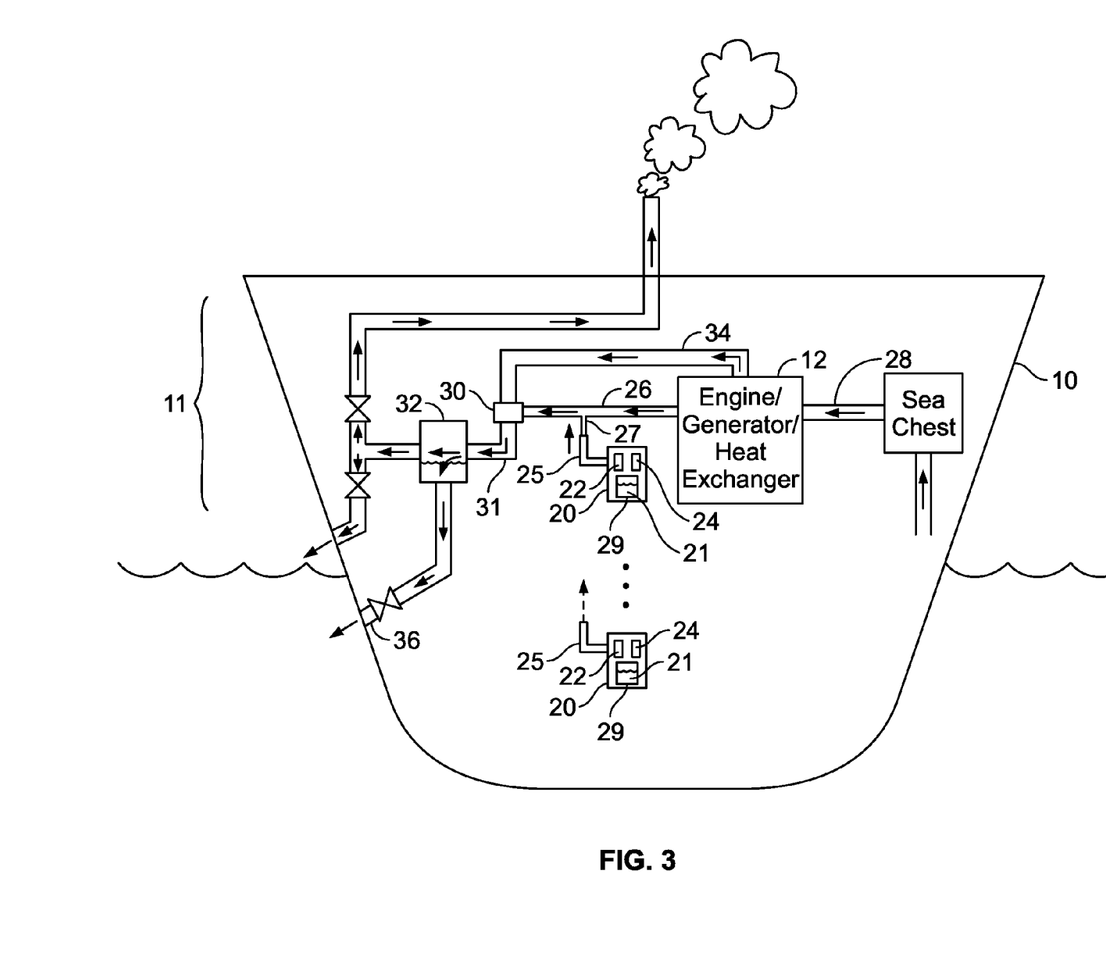
FIG. 3 is a diagrammatic overview showing a typical raw-water cooling and wet exhaust system of a yacht diesel engine embodying an illustrative emission control system (ECS) of the invention herein.

Referring to FIG. 1 and FIG. 3 of the drawings, as described in the Brief Description of the Drawings section above, an illustrative embodiment of an emission control system (ECS) 20 according to the present invention comprises a stand 40, product container 29 containing a dispersing product 21, a pump 22 connected to the product container 29 and dispersing product by a tube 23, and a control system 24 that controls the pump 22. The pump 22 is connected to the marine vessel's wet exhaust system via a second tube 25 coupled to a water cooling and exhaust system 11 of marine vessel 10, for example, coupled to a cooling water discharge pipe 26 at an injection point 27.

The base or support stand 40 provides a self-contained modular approach to installing and securing the ECS 20 as an add on system to a water cooling and wet exhaust system 11 for a marine vessel engine 12. For example, stand 40 can be generally constructed of steel and include a base upon which the product container 29 rests and an upright back upon which the pump 22 and control system 24 are mounted. Additionally, the product container 29 can be further retained to the stand 40 by side supports located on each side and extending between midpoints of the base and upright back, and by a strap 42. The strap 42 can be releasably secured by retainers 44 coupled with the side supports.

In an alternative embodiment (not shown in the figures), connection of the pump 22 to the marine vessel's cooling and exhaust system 11 can similarly be made by coupling second tube 25 at an injection point in a cooling water suction pipe 28 through which the raw cooling water is drawn into the engine 12 or heat exchanger(s) (not shown in the figures); i.e., in the latter case, second tube 25 is coupled at an injection point upstream from the engine 12, either driving a generator or for propulsion. In yet another alternative embodiment (not shown in the figures), connection of the pump 22 to the marine vessel's cooling and exhaust system 11 can similarly be made by coupling second tube 25 at an injection point downstream from the spray ring 30 and into the pipe 31 that carries the mixture of cooling water and exhaust gases into the water silencer 32 (also commonly know as the water-lift box), or by coupling tube 25 into the water silencer 32.

While, as illustrated in FIG. 3 of the drawings, second tube 25 is shown to be coupled to the cooling water discharge pipe 26, i.e., at an injection point between the engine 12 and the spray ring 30, it is to be understood that, as contemplated herein, connection of the pump 22 to the marine vessel's cooling and exhaust system 11 can be made by coupling second tube 25 at any suitable injection point in the wet exhaust system anywhere from the cooling water suction pipe 28 through to point of discharge, including, for example, before the engine 11, before or after the spray ring 30, and before or after the water silencer 32. In one aspect, the connection may be made before or in the marine vessel's "sea chest" (not shown in the figures) or before or in the heat exchanger(s). In one embodiment of the present invention, connection of the pump 22 to the marine vessel's exhaust system is made by coupling second tube 25 at an injection point downstream from the engine 12 and upstream of the spray ring 30, i.e., as represented in FIG. 2.

Figure 2:
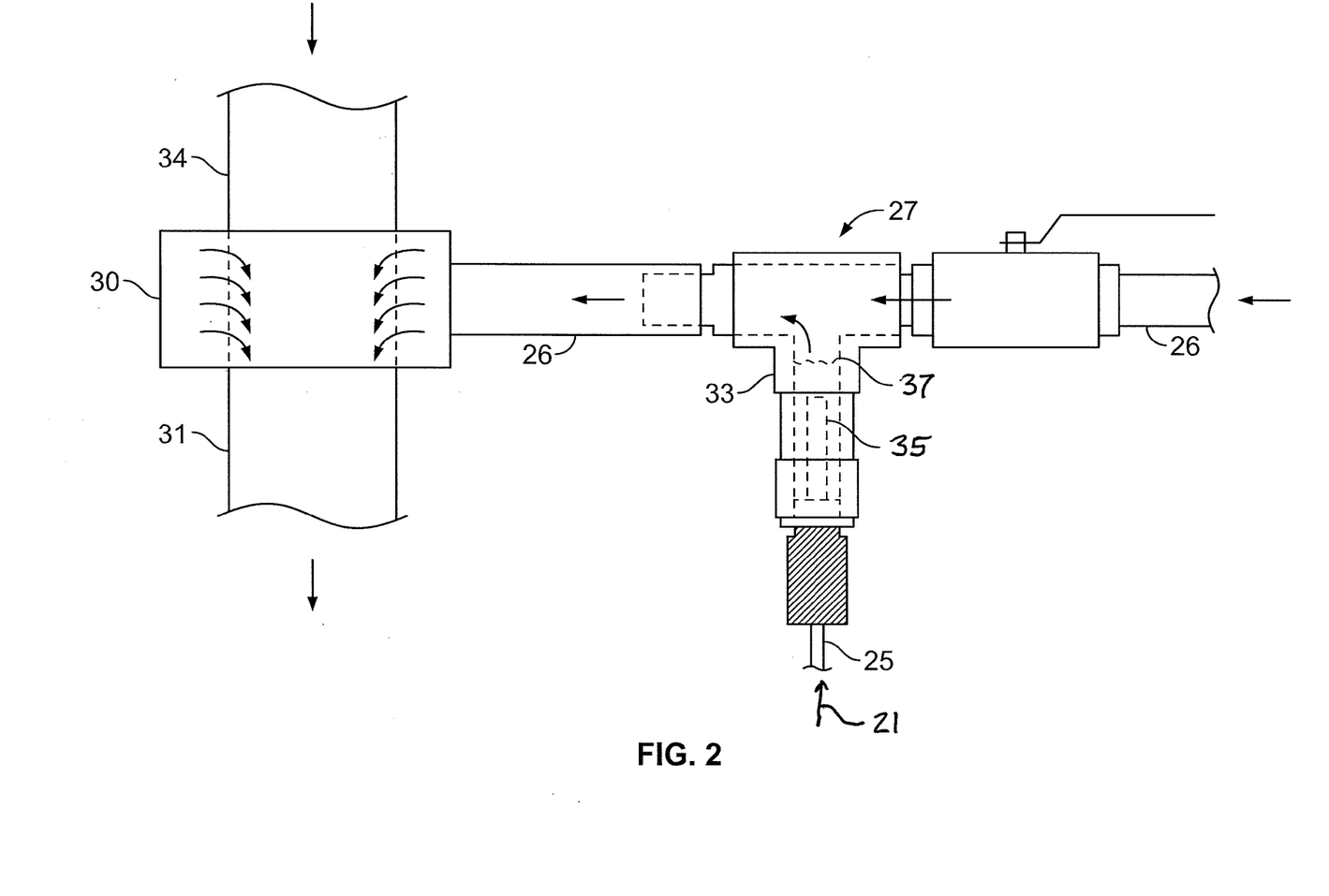
FIG. 2 illustrates an example of the coupling of the supply tube from the ECS to an injection point upstream from the spray ring of the water cooling and exhaust system.

Referring now to FIG. 2, coupling of the second tube 25, leading from the pump 22, to any of the pipes of the marine vessel's wet exhaust system (e.g., to any of pipes 26, 28, 31 or 34) at any of the injection points described in the foregoing illustrative embodiments can be made by any of the standard coupling methods known in the pertinent art. Pipes of marine vessels' wet exhaust systems are typically made of metal, such as aluminum, steel, copper/nickel, and the like. At the point of injection, for example, in discharge pipe 26, the second tube 25 supplies dispersing product 21 into the flow of cooling water so that it is a solution of cooling water and dispersing product 21 that is sprayed into the exhaust pipe 31 by spray ring 30.

In an illustrative embodiment of the invention, a through tee fitting 33 is inserted into cooling water discharge pipe 26 at the desired injection point for the dispersing product 21. The second tube 25 can be optionally coupled to the fitting 33 using a wet junction. The wet junction includes a vertically oriented chamber 37 in which cooling water and/or dispersing product 21 resides, even if the engine 12 is shut off and the cooling water stops flowing and drains out of discharge pipe 26.

Advantageously, the opening from which the dispersing product 21 is injected into the chamber 37, for example, injector 35, is submerged in the fluid within the chamber 37. Were this not the case, upon the cooling water being shut off and ambient heat drying the cooling water remaining within the discharge pipe 26, the generally small opening of the tubing 25 connecting with the discharge pipe 26 could encrust over with salt or other mineral crystals, potentially plugging it. By providing a small reservoir of water in chamber 37 in which the small opening of injector 35 is submerged, evaporation over a much longer extended period of time of non-operation can be endured without a risk of the injector 35 being plugged.

It should be noted that, in regard to the spray ring 30, many different types of spray rings (and mixing elbows) from various manufacturers worldwide are used in marine vessel exhaust systems, and all function essentially to spray or mix the raw cooling water into the exhaust gas. It is understood that the ECS of the present invention is independent of the spray ring, and would be expected to function as described herein regardless of the type of spray ring used on any particular marine vessel, the important aspect being that the dispersing product 21 is sufficiently admixed and agitated with the cooling water and exhaust gases.

The second tube 25, as well as product tube 23 that connects the product container 29 to the pump 22, can be any suitable commercial tube or hose of an appropriate size, such as a ¼" tube, a ½" tube, and the like. The tubes 23 and 25 are preferably clear or translucent so that the flow of dispersing product 21 through the tubes can be easily observed, and any system difficulty easily troubleshot.

These tubes or hoses can be made of any of the full range of the standard heat resistant and chemical resistant plastic or rubber tubing and hose materials, such as Teflon®, polyurethane, polyethylene, polypropylene, Tygon®, PVC blend hoses, and the like, including metal-braided tubes and hoses (e.g., tubes and hoses braided with stainless steel, and the like). However, it should be understood that the tubing used should preferably be compatible with the hot environments that are typical of generator engines and exhaust systems.

The product container 29 can be any container suitable for holding the dispersing product 21. Thus, the product container can be any generic container selected from the full range of the standard, commercially available chemical resistant containers, illustratively, but not limited to, chemical resistant plastic bottles, jars or jugs, chemical resistant tempered and/or coated glass bottles, jars or jugs, chemical resistant metal and/or coated metal bottles, jars or jugs, and the like. The size of the product container can be conveniently selected from any size commensurate with the desirable amount of dispersing product, depending on available space and/or on the desired frequency of refill of the dispersing product. Solely for the purpose of illustration, the product container can be a plastic see-through bottle. Tubing 23 that connects the product container 29 with the pump 22 extends down into the container 29, terminating near or at the bottom with a uptake port 38. Also provided with the tubing 23 is a level monitor 39 that provides a signal to the pump 22 or control system 24, resulting in a warning upon the dispersing product 21 dropping below a first triggering level and/or shutting the pump 22 off upon the dispersing product 21 dropping below a second triggering level.

The pump 22 used as part of this invention can be selected from any of the full range of commercially available pumps suitable for dosing of chemical-containing fluids. Such pumps are typically designed with provisions that allow for pumping of fluids at an adjustable, metered rate. Illustratively, the pump 22 can be, e.g., a solenoid dosing pump, a peristaltic (or continuous flow) dosing pump, and the like. Numerous types of suitable pumps are available from various manufacturers worldwide with provisions for electronic/digital inputting or manual dialing in of desired pumping rates and/or pumping frequencies. For example, the pump 22 can be a standard, chemical resistant pump such as the ones used on marine vessels (and elsewhere) for dosing chlorine bleach disinfectant into drinking water, or for treatment of sewage to kill bacteria before discharge into the environment. Illustratively, the pump 22 may be a metering pump such as ProMinent Beta b, available from ProMinent Fluid Controls, Inc., of Pittsburgh, Pa.

The control system 24 used as part of this invention can be selected from any of the full range of standard, commercially available control systems typically used to control pumps and other instruments. For example, the control system 24 may be selected from any type of commercial motor and pump control boxes that are designed for receiving signals coming in from the generator of the marine vessel's engine 12 as the engine starts or stops, for example, from the starting solenoid; the control system then controls the starting or stopping of the pump 22 at the same time that the engine starts or stops. In the illustrative embodiment, the control features to control the rate of dosing and the like are integral with the pump 22, and the control system 24 simply provides a power indicator and switches supply power or an on/off signal to the pump 22.

In accordance with one embodiment of the present invention, the emission control system herein is directed to an exhaust system of a marine vessel with a propulsion engine of a marine vessel. Optionally, in which the pump 22 is only activated when transmission is in neutral, or the boat is maneuvering slowly or in a bay, marina, or the like.

In accordance with another embodiment of the present invention, the emission control system 20 herein comprises one or more dispersing products 21. It should be understood that the dispersing product is preferably environmentally approved and, as used in this invention, is a product that has been designated as being environmentally safe and/or environmentally compatible by, e.g., the US Environmental Protection Agency (EPA) and/or similar local or international agencies. In another embodiment, the dispersing product 21 of this invention may comprise a single compound or a mixture of compounds selected from the group consisting of wetting agents, emulsifiers, soaps, detergents, anionic surfactants, cationic surfactants, nonionic surfactants, amphoteric (or zwitterionic) surfactants, and anti-foam agents. Further, the dispersing product can be any dispersing product known in the art that is environmentally safe. Solely for the purpose of illustration, the environmentally safe dispersing product 21 may simply be a common dishwashing soap, or a common marine biodegradable soap, detergent, dispersant, and/or degreaser, and the like. Preferably, in order to alleviate environmental concerns, the dispersing products of this invention should be phosphate and nitrate-free. For example, in the illustrative embodiment, the dispersing product may be a concentrated degreaser or other detergent available from Pro-Maka Products of Tampa, Fla., for example their products that qualify for Design for the Environment US EPA label and are biodegradable, phosphate free, moderate base (for example, about 11.0-11.9), moderate to no foaming, low viscosity (for example, less than about 50 cps), and 100% soluble in water.

In another embodiment, the dispersing product 21 may additionally include one or more agents that control or limit the biofouling of the sea chest, heat exchanger(s) and/or water-cooling pipes of the marine vessel 10 with marine organisms. Biofouling of a marine vessel's sea chest, heat exchanger(s) and water-cooling pipes with marine organisms is a very serious problem caused by the slow attachment and growth of barnacles and related marine crustaceans, encrusting bryozoans, mollusks, tube worms, zebra mussels, and the like (collectively known as calcareous or hard fouling), or algae, slimes and hydroids (collectively known as non-calcareous or soft fouling). A variety of environmentally acceptable, rapidly biodegradable antifouling agents are known in the art and are commercially available. It is understood that in the case where one or more antifouling agents are included in the dispersing product to help alleviate this biofouling problem in the marine vessel's sea chest, heat exchanger(s) and water-cooling pipes, connection of the second tube 25 would have to be made before or in the marine vessel's sea chest or before the heat exchanger(s).

In accordance with another embodiment of the present invention, the dispersing product 21 may be used in any concentration suitable for a particular diesel engine 12 wet exhaust system 11. Thus, the dispersing product may be used without dilution, or it may be diluted prior to use in one or more diluents, such as one or more aqueous-based solvents or one or more organic solvents, or any combinations thereof. Illustratively, the ratio of dispersing product to diluent may range from about 100:0 down to about 5:95 by volume. In one embodiment, the ratio of dispersing product to diluent is about 33:67 by volume. In another embodiment, the ratio of dispersing product to diluent is about 67:33 by volume. In yet another embodiment, the ratio of dispersing product to diluent is about 100:0 by volume. In the illustrative embodiment, the dispersing product is used without dilution. It is understood that long periods are desirable without needing to refill the product container 29 with the dispersing product 21, e.g., several days to several weeks. Illustratively, a typical refill frequency may be once every about 25 days or about 600 hours of operation for a 20 liter container 29. Thus, using the dispersing product 21 without dilution or at the highest possible concentration (i.e., high viscosity) that the particular pump 22 being used can tolerate provides the advantage of minimizing the frequency of needing to refill and extending the length of the period between refills.

For example, for a typical diesel engine 12 driving a generator producing 99 kw-185 kw at 60 Hz, the raw water flow used for cooling and sprayed into the wet exhaust system at spray ring 30 is about 9,540 liters per hour. For the dispersing product 21 used in the illustrative embodiment, the dosing rate provided through tubing 25 is set to about 33 milliliters per hour, which provides about 3.5 ppm of dispersing product 21 in the water. For another typical diesel engine 12 driving a generator producing 80 kw-155 kw at 50 Hz, the raw water flow used for cooling and sprayed into the wet exhaust system at spray ring 30 is about 7,980 liters per hour. For the dispersing product 21 used in the illustrative embodiment, an effective dosing rate provided through tubing 25 is set to about 33 milliliters per hour, which provides about 4.1 ppm of dispersing product 21 in the raw water. Thus an effect solution of dispersing product 21 in the raw water that is sprayed into the wet exhaust system at spray ring 30 is about 3.5 ppm to 4.1 ppm; however, higher or lower concentrations of dispersing product 21 in the raw water may be used depending on the spray ring installation, engine load, fuel used, oil usage, amount and type of particulates in the exhaust, desired level of effectiveness, and other variables. For example, in one illustrative embodiment, an effective dosing rate provided through tubing 25 was about 16 milliliters per hour, which provided about 2 ppm.

Detergent as used herein generally means any deterging or cleaning agent produced from synthetic organic compounds (rather than natural fats or oils and alkali as in soaps). Detergents are generally soluble in water, and act as wetting agents and emulsifiers.

Soap as used herein shall generally mean a deterging or cleaning agent made by reacting a natural triglyceride, fatty acid (e.g., tall oil fatty acid) or oil with an alkali or caustic (such as sodium or potassium hydroxide or an alkanolamine such as monoethanolamine, and the like) to produce the corresponding soap with glycerol as a by-product. Soaps, like detergents, exhibit surface-active properties, such as detergency and lowering of surface tension.

Surfactant as used herein shall mean any of the class of surface-active agents including (or that are included in) detergents, soaps, colloids and emulsifiers. Surfactants reduce the surface tension of water and cause it (1) to penetrate more easily into, or spread over the surface of, another material or (2) be penetrated by or become a dispersion of another material. Surfactants are wetting agents that orient themselves at the molecular interface of water with other surfaces and modify the liquid properties at the interface. A surfactant typically consists of two parts: a hydrophobic portion (e.g., a long hydrocarbon chain) and a hydrophilic portion that makes the entire compound soluble or dispensable or dispersible in water, and these hydrophobic and hydrophilic moieties render the compound surface-active. Surfactants suitable for use in the practice of the present invention are generally classified as anionic, cationic, nonionic, or amphoteric (zwitterionic).

Anti-foam agent as used herein shall mean any agent that hinders the formation of foam. Examples of suitable anti-foam agents include petroleum-based antifoams (e.g., 2-octanol, sulfonated oils, and the like) and silicone-based antifoams.

The dispersing product 21 of the present invention may include a variety of optional components in addition to those recited above. For example, the dispersing product, particularly when it comprises a surfactant (e.g., a nonionic surfactant), may further include an aqueous or organic solvent. Preferably, in order to alleviate environmental concerns, such organic solvents should be environmentally safe.

It should be understood that the dispersing product 21 of this invention should preferably be able to function effectively in the hot environments that are typical of the exhaust gases entering the exhaust systems of marine vessel diesel engines. Furthermore, the dispersing product 21 should desirably be able to react very fast and associate or bond with the hydrocarbons, DPM and other pollutants in the exhaust gases.

Operationally, the ECS 20 of the present invention works to help enhance the dispersion of hydrocarbon, DPM and other pollutants contained in the exhaust emissions of marine vessel diesel engines 12 according to the following illustrative embodiment. In this embodiment, as shown in FIG. 3, the pump 22 is connected to the wet exhaust system 11 via second tube 25 that is coupled to the cooling water discharge pipe 26 at injection point 27, i.e., downstream from the engine 12 and upstream from the spray ring 30. When the vessel's engine 12 is turned on, for example, the engine driving an electrical generator, the ECS control system 24 automatically starts the pump 22, which draws the dispersing product 21 out of the product container 29 at a desired, appropriate, pre-set flow rate. The process for determining and setting this desired, appropriate flow rate is described below. The dispersing product 21 enters into the flowing raw cooling water at injection point 27, is agitated and becomes admixed with the raw cooling water as it flows toward the spray ring 30, wherein upon reaching the spray ring the mixture is sprayed into the exhaust gases. The dispersing product bonds and becomes associated with the hydrocarbon, DPM or other pollutants contained in the exhaust gases, emulsifying them and dispersing them as the mixture exits into the surrounding environment, for example, at drain 36, located below the water line.

In regard to the flow rate of the raw cooling water in wet exhaust systems 11, while this flow rate varies from engine to engine and from vessel to vessel, however it is typically steady for generator engines, i.e., the raw cooling water generally flows at a fixed rate for each particular engine. When marine vessels 10 are docked or moored while their diesel engine-driven electrical generators are being run, the warmed cooling water and excess oil and/or other hydrocarbon and DPM exiting the exhaust system of the vessel 10 at drain 36 into the surrounding body of water rises to the surface, and can be visibly observed forming on the water surface. This is to be expected because the specific gravity of oils/hydrocarbons and DPM is generally lower than the specific gravity of water, and the associated discharged water is warmer than the surrounding body of water.

In operating the ECS system 20 of the present invention in a vessel 10 that is docked or moored while its diesel engine 12 driven electrical generator(s) is running, if the amount of dispersing product 21 being pumped into the raw cooling water and sprayed into the exhaust gases is less than the optimum amount needed to associate with all of the entrained oils/hydrocarbons and DPM, then some residual oils/hydrocarbons and DPM will continue to be visibly observed accumulating and floating on the surface of the surrounding body of water. On the other hand, if an excess amount of dispersing product 21 gets pumped into the raw cooling water and sprayed into the exhaust gases, then the remaining, unassociated dispersing product, which typically comprises detergents or soaps, can be visibly observed to form soapy foam or bubbles on the surface of the surrounding body of water.

Thus, in accordance with another embodiment of the present invention, a simple method is provided to determine the flow rate of dispersing product 21 that is optimum for a particular wet exhaust system 11 of a particular marine vessel 10. This method comprises the steps of running the ECS system 20 of the present invention while the vessel 10 is docked or moored with its generators running, and adjusting the flow rate of dispersing product either up or down, e.g., by manual adjustment of the dosing pump controls, until neither oil/hydrocarbon nor soapy foam or bubbles are observed to form on the surface of the surrounding body of water. It will be understood that this method of optimizing (or calibrating) the flow rate of dispersing product for a particular wet exhaust system 11 is not dependent on the degree of concentration of the dispersing product 21. It will also be understood that, because the flow rate of the raw cooling water in a particular wet exhaust system 11 is generally steady at a fixed rate, then the dispersing product flow rate, once determined and set, will not need to be re-optimized or re-calibrated for long periods of time, except for instance in cases where the vessel engine ages and starts to burn excess oil.

In another embodiment, a marine vessel 10 includes multiple generator engines 12, each having its own water cooling and wet exhaust system 11. Because each generator engine 12 is generally operated selectively and independently of the others, a separate ECS 20 can be utilized for each engine 12.

In another embodiment, the ECS 20 is utilized with the water cooling and wet exhaust system 11 for a propulsion engine 12 of a marine vessel 10. With this application, the above principles generally remain the same except that the pumping rate and ratio of the dispersing product 21 will likely be different. For example, it is advantageous to provide an RPM or % load signal from the engine 12 to the pump 22 so that the pumping rate for the dispersing product 21 can be adjusted automatically to accommodate higher cooling water flow rates and/or high hydrocarbon and DPM volumes in the exhaust system.

In one embodiment, described herein is an emission control system (ECS) for facilitating the emulsification and/or dispersion of hydrocarbon, diesel particulate matter (DPM) and other pollutants from the exhaust gas output from a diesel engine of a marine vessel, the diesel engine including a water cooling and exhaust system, comprising a pump, a control system that controls the pump, a product container containing an environmentally approved dispersing product, and a supply tube coupling the pump, dispersing product, and water cooling and exhaust system; and wherein the environmentally approved dispersing product is injected into the water cooling system at a rate determined by the control system.

In another embodiment, described herein is an emission control system as described above, wherein the water cooling and exhaust system includes a spray ring coupling an outlet pipe carrying cooling water from the engine to an exhaust pipe, and the supply tube is connected to the outlet pipe. In one illustrative embodiment, the supply tube is connected to the exhaust pipe upstream of the spray ring. In another illustrative embodiment, the supply tube is connected to the exhaust pipe downstream of the spray ring.

In another embodiment, described herein is an emission control system as described above, wherein the water cooling and exhaust system further includes an inlet pipe carrying cooling water to the engine, and the supply tube is connected to the inlet pipe.

In another embodiment, described herein is an emission control system as described above, wherein the water cooling and exhaust system further includes a sea chest, and the supply tube is connected before or into the sea chest.

In another embodiment, described herein is an emission control system as described above, wherein the supply tube is connected before the heat exchanger(s).

In another embodiment, described herein is an emission control system as described above, wherein the environmentally approved dispersing product comprises a single compound or a mixture of compounds selected from the group consisting of wetting agents, emulsifiers, soaps, detergents, anionic surfactants, cationic surfactants, nonionic surfactants, amphoteric surfactants, and anti-foam agents.

In another embodiment, described herein is an emission control system as described above, wherein the environmentally approved dispersing product further comprises an agent that controls or limits the growth of biofouling organisms.

In another embodiment, described herein is an emission control system as described above, wherein the environmentally approved dispersing product further comprises an environmentally approved aqueous or organic solvent.

In another embodiment, described herein is a method for facilitating the emulsification and/or dispersion of hydrocarbon and DPM from the exhaust gas output from a diesel engine of a marine vessel, comprising injecting at a controlled rate an environmentally approved dispersing product into the engine raw cooling water.

In another embodiment, described herein is a method as described above, wherein the environmentally approved dispersing product is injected into the engine raw cooling water at a point before the raw cooling water admixes with the exhaust gas.

In another embodiment, described herein is a method as described above, wherein the environmentally approved dispersing product is injected into the engine raw cooling water at a point after the raw cooling water admixes with the exhaust gas.

In another embodiment, described herein is a method as described above, wherein the environmentally approved dispersing product comprises a single compound or a mixture of compounds selected from the group consisting of wetting agents, emulsifiers, soaps, detergents, anionic surfactants, cationic surfactants, nonionic surfactants, amphoteric surfactants, and anti-foam agents.

In another embodiment, described herein is a method as described above, wherein the environmentally approved dispersing product further comprises an agent that controls or limits the growth of biofouling organisms.

In another embodiment, described herein is a method as described above, wherein the environmentally approved dispersing product further comprises an environmentally approved aqueous or organic solvent.

While the invention has been illustrated and described in detail in the foregoing drawings and description, the same is to be considered as illustrative and not restrictive in character, it being understood that only illustrative embodiments thereof have been shown and described and that all equivalents and all changes and modifications known in the art that come within the spirit and scope of the invention as defined herein are desired to be protected. For example, although the illustrative embodiments relate to marine vessels, the invention may also be used in other applications involving exhaust systems in which emulsification and/or dispersion of pollutants is desired, whether in a wet or dry exhaust system.

The invention claimed is:

1. An emission control system (ECS) for facilitating the at least one of emulsification and dispersion of hydrocarbon, diesel particulate matter (DPM) and other pollutants from the exhaust gas output from a engine of a marine vessel, the engine including a water cooling and wet exhaust system, comprising:
   an outlet pipe carrying raw cooling water from the engine water cooling to the wet exhaust system;
   a dosing pump;
   a product container containing an environmentally approved dispersing product; and
   a supply tube coupling the pump, dispersing product, and at least one of the water cooling system and the wet exhaust system; and
   wherein the environmentally approved dispersing product is injected at a controlled rate into the at least one of the water cooling system and the wet exhaust system.

2. The emission control system of claim 1, further comprises a spray ring coupling the outlet pipe to the wet exhaust system, and wherein the supply tube is connected to the outlet pipe.

3. The emission control system of claim 1, wherein the supply tube is connected to the wet exhaust system upstream of a connection coupling the water cooling system and the wet exhaust system.

4. The emission control system of claim 1, wherein the supply tube is connected to the wet exhaust system downstream of a connection coupling the water cooling system and the wet exhaust system.

5. The emission control system of claim 1, wherein the water cooling system further includes an inlet pipe carrying raw cooling water to the engine water cooling system, and the supply tube is connected to the inlet pipe.

6. The emission control system of claim 1, wherein the water cooling system further includes a sea chest, and the supply tube is connected to an inlet into the sea chest.

7. The emission control system of claim 1, wherein the engine water cooling system includes a heat exchanger, and the supply tube is connected to an inlet into the heat exchanger.

8. The emission control system of claim 1, wherein the environmentally approved dispersing product comprises at least one compounds selected from the group consisting of wetting agents, emulsifiers, soaps, detergents, anionic surfactants, cationic surfactants, nonionic surfactants, and amphoteric surfactants.

9. The emission control system of claim 1, wherein the environmentally approved dispersing product further comprises an agent that limits the growth of biofouling organisms.

10. The emission control system of claim 1, wherein the environmentally approved dispersing product comprises an environmentally approved aqueous or organic solvent.

11. The emission control system of claim 1, further comprising a wet junction coupling the supply tube and at least one of the water cooling system and wet exhaust system, the wet junction including a chamber oriented vertically, so that gravity acts to hold dispersing product in the chamber, and an injector coupled to the supply tube, the injector extending from the bottom of the chamber and terminating at a point below a top of the chamber.

12. The emission control system of claim 1, wherein the dosing pump includes an integral controller.

13. The emission control system of claim 1, further comprising a controller operatively coupled to the dosing pump to at least one of manually and electrically adjust the rate of pumping of the dispersing product.

14. A method for facilitating the at least one of emulsification and dispersion of hydrocarbon and DPM from the exhaust gas output from an engine of a marine vessel, comprising:
   drawing an environmentally approved dispersing product from a product container; and
   injecting the dispersing product into the engine raw cooling water at a controlled rate.

15. The method of claim 14, wherein the environmentally approved dispersing product is injected into the engine raw cooling water at a point before the raw cooling water admixes with the exhaust gas.

16. The method of claim 12, wherein the environmentally approved dispersing product is injected into the engine raw cooling water at a point after the raw cooling water admixes with the exhaust gas.

17. The method of claim 14, wherein the environmentally approved dispersing product is injected into the engine raw cooling water at a point after the raw cooling water passes through the engine cooling system and before it admixes with the exhaust gas.

18. The method of claim 14, wherein the environmentally approved dispersing product comprises at least one compound selected from the group consisting of wetting agents, emulsifiers, soaps, detergents, anionic surfactants, cationic surfactants, nonionic surfactants, and amphoteric surfactants.

19. The method of claim 14, wherein the environmentally approved dispersing product further comprises an agent that limits the growth of biofouling organisms.

20. The method of claim 14, wherein the environmentally approved dispersing product further comprises an environmentally approved aqueous or organic solvent.

21. An emission control system (ECS) for facilitating the at least one of emulsification and dispersion of hydrocarbon, diesel particulate matter (DPM) and other pollutants from the exhaust gas output from a plurality of engines of a marine vessel, the engines each including a water cooling and wet exhaust system, comprising:
   an outlet gibe carrying raw cooling water from the engine water cooling to the wet exhaust system;
   a plurality of dosing pumps;
   at least one product container containing an environmentally approved dispersing product; and
   a plurality of supply tubes coupling each of the plurality of pumps with the dispersing product, and at least one of the water cooling system and wet exhaust system; and
   wherein the environmentally approved dispersing product is injected at a controlled rate into each of the at least one of the water cooling system and exhaust system when the respective engine is operating.

22. The emission control system of claim 21, further comprising a spray ring coupling the outlet pipe carrying raw cooling water to the wet exhaust system, and wherein a respective one of the plurality of supply tubes is connected to the outlet pipe.

* * * * *